US006837552B2

(12) United States Patent
Reuter et al.

(10) Patent No.: US 6,837,552 B2
(45) Date of Patent: Jan. 4, 2005

(54) HYBRID BRAKE SYSTEM FOR A VEHICLE

(75) Inventors: David F. Reuter, Beavercreek, OH (US); Gary C. Fulks, Dayton, OH (US); Timothy M. Schlangen, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/121,454

(22) Filed: Apr. 12, 2002

(65) Prior Publication Data

US 2003/0193239 A1 Oct. 16, 2003

(51) Int. Cl.[7] .................................................. B60T 8/88
(52) U.S. Cl. ...................... 303/122.09; 303/20; 303/63
(58) Field of Search ........................... 303/3, 5, 10, 11,
303/15, 20, 9.61, 0.63, 122.03, 122.04,
152, 155, 113.3–113.5, 114.1, 115.2, DIG. 9,
DIG. 11, 9.63

(56) References Cited

U.S. PATENT DOCUMENTS

| | | | | |
|---|---|---|---|---|
| 4,875,741 A | * | 10/1989 | Ozawa et al. ............. | 303/116.4 |
| 5,234,262 A | * | 8/1993 | Walenty et al. ............. | 303/155 |
| 5,390,992 A | * | 2/1995 | Walenty et al. ............. | 303/112 |
| 5,632,534 A | * | 5/1997 | Knechtges .................. | 303/152 |
| 5,890,778 A | * | 4/1999 | Sager ......................... | 303/186 |
| 6,012,782 A | * | 1/2000 | Takahira et al. ............ | 303/112 |
| 6,099,087 A | * | 8/2000 | Mortimer et al. ......... | 303/115.2 |
| 6,105,737 A | * | 8/2000 | Weigert et al. ............ | 188/158 |
| 6,305,757 B1 | * | 10/2001 | Ohsaki et al. ........... | 303/114.3 |

FOREIGN PATENT DOCUMENTS

| | | |
|---|---|---|
| EP | 0926032 A2 * | 6/1999 |
| EP | 1 175 322 B1 | 9/2003 |
| GB | 2349675 A * | 11/2000 |
| WO | WO 00/66410 | 11/2000 |

OTHER PUBLICATIONS

US 2002/0117891 to Harris.*
ISATA, "Electric Brake System for Passenger Vehicle—Ready For Production", Mr. R. L. Wells and Mr. J. E. Miller, Delco Chassis Division, Automotive Components Group Worldwide, General Motors Corporation, USA, pp. 349–356.
Patent Abstract of Japan, Publication No.: 2002067909A, dated Aug. 3, 2002.

* cited by examiner

Primary Examiner—Pam Rodriguez
(74) Attorney, Agent, or Firm—Michael D. Smith

(57) ABSTRACT

A hybrid brake apparatus for a vehicle includes a hydraulic brake circuit having a first fluid circuit and a second fluid circuit connected to a master cylinder for generating hydraulic pressure in the first and a second fluid circuits, and electrically actuated brake elements controllable as a function of the hydraulic pressure in one or the other of the first and second fluid circuits. The apparatus may include a pedal feel emulator in one of the fluid circuits. The apparatus may also include a booster for amplifying pressure in the fluid circuits, a sensor for determining that the booster has failed, and control elements providing compensation for the failed booster during operation of the electrically actuated brakes while the booster is inoperative.

18 Claims, 2 Drawing Sheets

HYBRID BRAKE SYSTEM FOR A VEHICLE

TECHNICAL FIELD OF THE INVENTION

This invention relates to vehicle brakes, and more particularly to a vehicle with a hybrid brake system having front hydraulic brakes and rear electrically actuated brakes.

BACKGROUND OF THE INVENTION

Since the mid 1930s, vehicles such as automobiles and light trucks have predominantly utilized hydraulic brake systems having a pedal operated master cylinder supplying pressurized hydraulic fluid to disk or drum braking devices at each wheel.

Early hydraulic brake systems utilized a single hydraulic fluid circuit supplying pressurized fluid from the master cylinder to all four corners of the vehicle. A break in the fluid circuit anywhere rendered the entire hydraulic brake system inoperative.

In order to prevent a total loss of hydraulic braking in the event of a failure of part of the system, failsafe hydraulic split brake systems were developed that provided two separate fluid circuits from the master cylinder, configured such that a failure of either of the two fluid circuits would still leave hydraulic brakes operative on at least two corners of the vehicle. In rear wheel drive automobiles and light trucks, one fluid circuit typically served the front wheels, and the other fluid circuit served the rear wheels, to provide a front/rear (F/R) failsafe hydraulic split system. Front wheel drive vehicles typically used a diagonal failsafe hydraulic split system, having one front corner and the diagonally opposite rear corner of the vehicle on one fluid circuit, and the other front corner and its diagonally opposite rear corner on the second fluid circuit. These failsafe provisions were incorporated into government regulations that required brake systems to be configured such that a single failure of the braking system would still leave the brakes on at least two corners of the vehicle operational.

In the years since hydraulic brake systems became the norm, many additional features have been added to further enhance safe operation and optimize vehicle performance. Modern brake systems often include a booster that amplifies force exerted on the brake pedal, to provide power brakes that allow a person operating the vehicle to control the brakes with significantly less force on the brake pedal than is required in a non-boosted brake system. Anti-lock brake systems (ABS) were developed in which valves controlling fluid flow to each corner of the vehicle were pulsed, in response to signals received from rotation sensors monitoring each wheel, to preclude locking the brakes on slippery road surfaces. Traction control systems (TCS) were added that controlled both the brakes and the engine throttle setting to improve traction and handling of the vehicle during maneuvers, such as acceleration or turning, when the brakes are not being applied by the operator. Vehicle dynamics control (VDC) further advanced the level of sophistication of brake systems to utilize a number of sensors throughout the vehicle, and a more advanced onboard computer with higher throughput, to monitor forces acting on the vehicle, together with inputs indicating operational commands from the operator applied to the steering, braking, and drive systems. VDC analyzes the data received from the sensors and coordinates operation of the various elements of the vehicle brake system, power-train, and suspension to provide enhanced vehicle safety or performance of the vehicle.

The addition of all of these enhancements has made hydraulic brake systems very complex. Numerous valves, sensors, and electronic control components are required.

Recent advances in technology have made it feasible to develop a brake system that utilizes electrically actuated brakes, rather than hydraulic brakes, on at least the rear corners of a vehicle. Utilizing electrically actuated brakes would allow a number of the components currently required in fully hydraulic brake systems to be eliminated, thereby resulting in ease of installation for the vehicle assembly plants. Hydraulic brake systems must be carefully filled with fluid, to preclude trapping air in the hydraulic lines that would interfere with operation, thereby increasing manufacturing complexity, time and cost. Electrically actuated brakes eliminate the manufacturing complexity, time and cost associated with filling the fluid lines in hydraulic brake systems. Electrically actuated brakes also provide opportunities for additional functionality, such as electrical park brake capability, and improved operational performance in modern brake systems.

Modern brake systems rely heavily on electronic controls to coordinate and control functions such as ABS, TCS, and VDC, making it logical to move toward an all-electric brake system. Most modern automobiles and light trucks utilize a 12 volt electrical system. While 12 volt electrically actuated brakes are currently feasible for rear brakes, it is generally accepted by those having skill in the art, that front electrically actuated brakes would need to be operated at a higher voltage, such as the proposed 42 volt systems now in development, to be able to cost-effectively manage the higher power levels required. The higher voltage is required because the front brakes handle a significantly higher percentage of the braking load than the rear brakes. As a generally accepted rule of thumb, the front brakes provide $\frac{2}{3}$ of the stopping power, and the rear brakes provide the remaining $\frac{1}{3}$ when both the front and rear brakes are operating for a moderate vehicle deceleration.

Providing a hybrid brake apparatus having electrically actuated brakes on the rear of a vehicle and hydraulic front brakes would potentially reduce the work load on the hydraulic brake system by approximately $\frac{1}{3}$, thereby allowing components in the hydraulic portion of the hybrid system to be downsized, thereby saving cost, space, and weight. Reducing the required work on the hydraulic portion of the system may also make it possible to more readily achieve a "car-like" feel to the brake pedal on light duty trucks.

What is needed, therefore, is a hybrid brake apparatus having both hydraulic and electrically actuated brakes, that meets or exceeds the safety requirements previously applied to all-hydraulic brake systems, and providing performance capabilities that are as good as or better than prior all-hydraulic brake systems. Such a hybrid brake apparatus should be applicable to a vehicle having front hydraulic and rear electrically actuated brakes, and should also be applicable to a brake system including functions such as ABS, TCS, and VDC. It is also highly desirable that the hybrid brake apparatus have the same or better operational feel to a driver applying force to the brake pedal, as a conventional all-hydraulic brake system.

SUMMARY OF THE INVENTION

Our invention provides a hybrid brake apparatus, meeting the requirements discussed above, through use of a hydraulic brake circuit including a pressure sensor for sensing hydraulic pressure in the hydraulic brake circuit, and electrically actuated brake means controllable as a function of the hydraulic pressure in the hydraulic brake circuit. Some forms of our invention may also include additional control sensors, such as wheel speed sensors, or a brake pedal travel sensor, and the electrically actuated brakes may be controlled as a function of the hydraulic pressure in the hydraulic brake circuit in combination with information received from the additional control sensors. In one form of our invention, the hydraulic brake circuit further includes hydraulically actuated front brake means for a vehicle having front and rear brakes, and the electrically actuated brake means further includes rear brake means for the vehicle.

The hydraulic brake circuit may include a brake pedal actuated master cylinder for generating the hydraulic pressure in the hydraulic circuit in response to force being applied to the brake pedal. Our hybrid brake apparatus may also include a booster for amplifying the pedal force. The brake apparatus may further include means for sensing a failure of the booster, and compensating for the un-boosted hydraulic pressure as sensed by the pressure sensor, in controlling the electrically actuated brakes while the booster is inoperative.

The hydraulic brake circuit may further include a pedal feel emulator. In one form of our invention, the pedal feel emulator may include a cylinder in fluid communication with the hydraulic pressure in the hydraulic brake circuit, and spring loaded piston means slidably disposed within and sealed to the cylinder. The cylinder and piston form a pressure cavity within the cylinder for receipt of hydraulic fluid, resisted by the spring force generated by the spring loaded piston means, to thereby create a resistance force and movement of the brake pedal emulating the force and movement of a brake pedal.

In one form of our invention, a brake apparatus has a hydraulic brake circuit including a first fluid circuit and a second fluid circuit connected to a master cylinder for generating hydraulic pressure in the first and a second fluid circuits. A pressure sensor for sensing the hydraulic pressure is operatively connected to one of the fluid circuits, and electrically actuated brake means are controlled as a function of the hydraulic pressure sensed by the pressure sensor in the one of the fluid circuits of the hydraulic brake circuit. The hydraulic brake circuit may include hydraulically actuated front brake means for a vehicle having front and rear brakes, and the electrically actuated brake means may include rear brake means for the vehicle.

The first and second fluid circuits may respectively include right and left front brake means for the vehicle. The pressure sensor may be operatively connected for sensing hydraulic pressure in the first fluid circuit, and the brake apparatus may include a second pressure sensor operatively connected for sensing hydraulic pressure in the second fluid circuit, with the electrically actuated brake means being controllable as a function of the hydraulic pressure in either the first or the second fluid circuit. This arrangement provides a front/front/rear (F/F/R) failsafe split system in which a single failure of either front fluid circuit, will leave a braking system having one front and both rear brakes still operational, thereby providing failsafe brake operation that exceeds typical regulatory requirements and superior performance to F/R or diagonal split prior all-hydraulic brake systems.

Alternatively, the second fluid circuit of the hydraulic brake circuit may include hydraulically actuated front brake means for a vehicle having front and rear brakes, with the electrically actuated brake means including rear brake means for the vehicle, and the pressure sensor operatively connected to the first fluid circuit of the hydraulic brake circuit. This arrangement provides a front/rear F/R failsafe split hybrid brake system in which a single failure of either fluid circuit, or the pressure sensor will leave a braking system having either both front or both rear brakes still operational, thereby providing failsafe brake operation that meets typical regulatory requirements and equals performance of prior F/R split all-hydraulic brake systems. The first fluid circuit may include a pedal feel emulator, and the second fluid circuit may include left and right front hydraulic brake means of the vehicle.

This alternative form of our invention provides the advantage of significantly reducing the number of components required in the hybrid brake apparatus, particularly where the apparatus includes functions such as ABS, TCS, and VSC. In addition, only one pressure sensor is required to achieve F/R failsafe split system operation.

The alternative form of our invention may also include a booster for amplifying hydraulic pressure in the first and second fluid circuits, with the electrically actuated brakes being controlled as a function of the hydraulic pressure amplified by the booster in the first fluid circuit. The alternative form of our invention may further include means for sensing a failure of the booster, and compensating for the un-boosted hydraulic pressure as sensed by the pressure sensor in controlling the electrically actuated brakes while the booster is inoperative. By compensating for the un-boosted hydraulic pressure, performance of the electrically actuated brakes may be significantly improved by adjustment of the output gain from the pressure sensor signal, thus improving failed booster vehicle stopping performance.

Our invention may also take the form of a method for operating a brake using the apparatus described herein, and is applicable to a variety of electrically actuated braking devices including electro-mechanical and electro-hydraulic brake devices.

The foregoing and other features and advantages of our invention will become further apparent from the following detailed description of exemplary embodiments, read in conjunction with the accompanying drawings. The detailed description and drawings are merely illustrative of our invention rather than limiting, the scope of the invention being defined by the appended claims and equivalents thereof.

DETAILED DESCRIPTION

Figure 1:
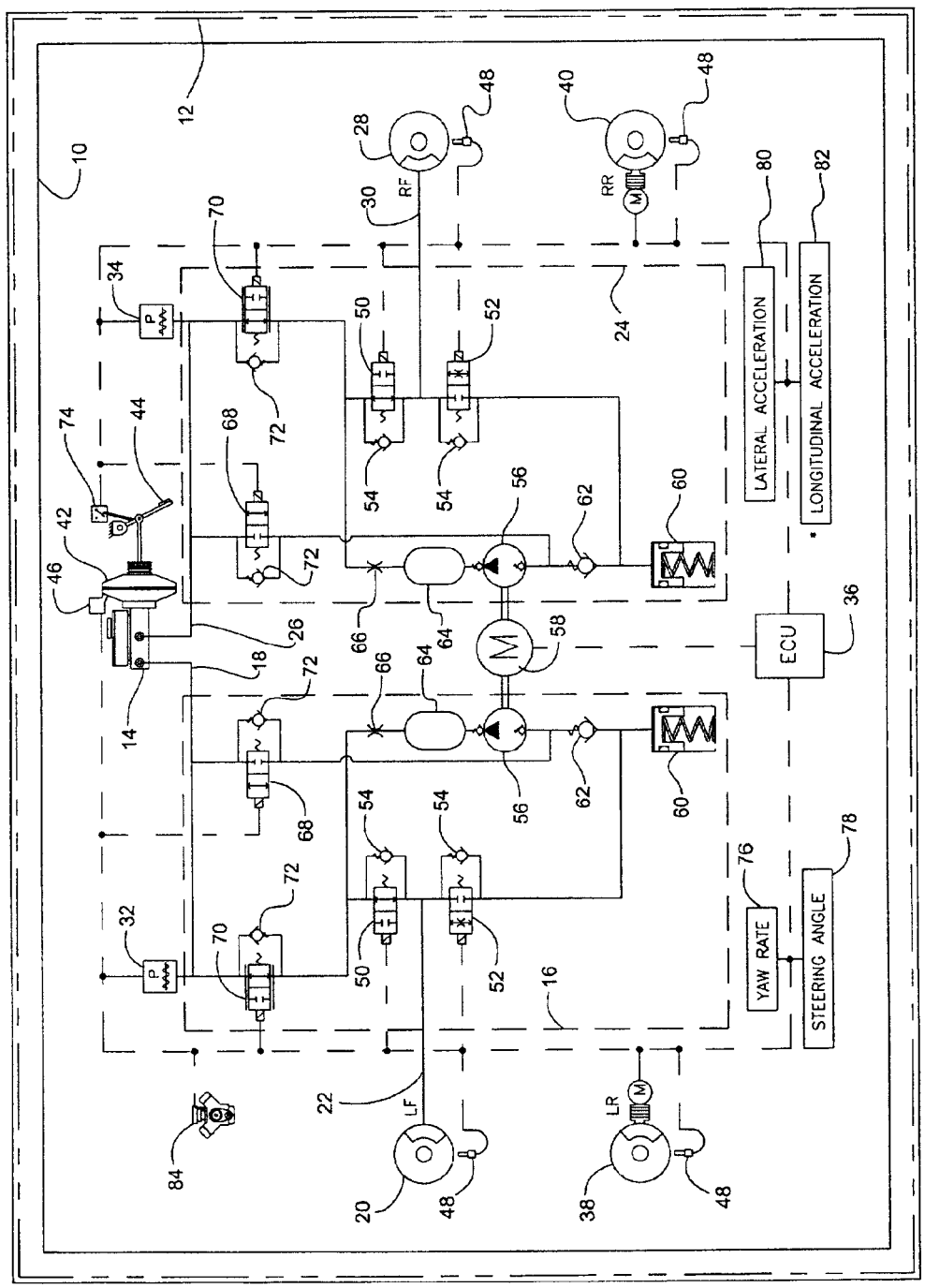
FIG. 1 is a schematic representation of a first embodiment of a brake apparatus according to our invention, providing a Front/Front/Rear (F/F/R) split failsafe hybrid brake system, having ABS, TCS, and VDC.

FIG. 1 depicts a first exemplary form of a brake apparatus 10, according to our invention, for a vehicle 12. The brake apparatus 10 includes a hydraulic brake circuit having a first and a second fluid circuit, connected to a master cylinder 14, for generating near equivalent hydraulic pressures in both the first and second fluid circuits. The first fluid circuit includes a first hydraulic control unit (HCU) 16, connected to the master cylinder 14 by a fluid line 18, and a left front hydraulic brake means 20 connected to the first HCU 16 by fluid line 22. The second fluid circuit includes a second hydraulic control unit (HCU) 24, connected to the master cylinder 14 by a fluid line 26, and a right front hydraulic brake means 28 connected to the second HCU 16 by fluid line 30.

A first pressure sensor 32 is operatively connected to the first HCU 16 for sensing hydraulic pressure in the first fluid circuit. A second pressure sensor 34 is operatively connected to the second HCU for sensing hydraulic pressure in the second fluid circuit. The first and second pressure sensors 32, 34 are connected to an electronic control unit (ECU) 36 via electrical conductors, as indicated by dashed lines in FIG. 1

The brake apparatus 10 also includes a left and a right rear electrically actuated brake means 38,40, connected to the electronic control unit (ECU) 36. The left and right rear electrically actuated brake means 38, 40 are controlled by the ECU 36 as a function of the hydraulic pressure in either the first or the second fluid circuit, as measured by either the first or the second pressure sensor 32, 34.

By virtue of this arrangement, if either the first or the second fluid circuit experiences a failure, or if either the first or second pressure sensors 32, 34 should fail, the rear brakes 38, 40 can still be controlled by the ECU 36, using the signal from the pressure sensor in the other fluid circuit. For a failure of one pressure sensor (32 or 34), therefore, the brake means 20, 28, 38, 40 at all four corners of the vehicle 12 will remain totally operational. If one of the first or second fluid circuits fail, the front hydraulic brake means (20 or 28) of the other fluid circuit and both electrically actuated rear brake means 38, 40 will continue to provide braking at three of the four corners of the vehicle 12. In this manner, our brake system 10 provides uninterrupted braking on three or four corners of the vehicle, after a single failure, that significantly exceeds regulatory requirements for failsafe braking.

The first brake apparatus 10 further includes a vacuum booster 42 for amplifying hydraulic pressure in the first and second fluid circuits, to provide power brakes through amplification of the force exerted on a brake pedal 44 operatively connected to the master cylinder 14, such that the electrically actuated rear brakes 38, 40 are primarily controlled as a function of the hydraulic pressure amplified by the booster 42 in the first and second fluid circuits. The first brake apparatus 10 further includes means, in the form of a booster vacuum sensor 46 connected to the ECU 36 by electrical conductors, as shown by dashed lines in FIG. 1. The booster vacuum sensor 46 and ECU 36 provide means for sensing a failure of the booster 42, and compensating for the un-boosted hydraulic pressure as sensed by one of the first and second pressure sensors 32, 34 in controlling the electrically actuated brakes 38, 40 while the booster 42 is inoperative. In this manner, the braking force exerted by the rear electrically actuated brake means 38, 40 can be significantly increased by adjusting pressure sensor 32, 43 output gain, despite the loss of the amplifying effect of the booster 42, thus providing more failsafe brake force than would be the case in a purely hydraulic brake system.

As shown in FIG. 1, the exemplary brake system 10 also includes a number of components to provide ABS, TCS, and VDC operation, in addition to the basic brake operation described above. To enable operation in these modes, the apparatus 10 includes a wheel speed sensor 48, electrically connected to the ECU 36, for each of the front hydraulic and rear electrically activated brake means 20, 28, 38, 40. An inlet control valve 50 and an outlet control valve 52, each having associated therewith an associated bypass check valve 54, are included in each of the first and second hydraulic control units 16, 24, for controlling the flow of hydraulic fluid in and out of the first and second front hydraulic brake means 20, 28. The first and second HCU 16, 24 also each include a pump 56 driven by a common electric motor 58, connected via electrical conductors to the ECU 36. The first and second HCU 16, 24 each further include: an inlet accumulator 60; a TCS check valve 62; a damper chamber 64; a damper orifice 66; a prime valve 68; an isolation valve 70; and bypass check valves 72 associated with the prime and isolation valves 68, 70; for directing fluid flow within the first and second fluid circuits during operation in the various operational modes of our brake apparatus 10.

The vehicle 12 and our brake system 10 also include a pedal travel sensor 74, and additional sensors for yaw rate 76, steering angle 78, lateral acceleration 80, and longitudinal acceleration 82. The ECU 36 is also electrically connected to the engine 84 for controlling the engine throttle setting during certain operational modes.

We utilize the term "Front/Front/Rear (F/F/R) failsafe hybrid brake system" in referring to the brake apparatus 10 described thus far, because the apparatus 10 is configured to have two independent front brake circuits, and a single independent rear brake circuit, that may be used in various combinations for meeting and exceeding regulatory and operational requirements following a failure of any one of the F/F/R circuits.

Figure 2:
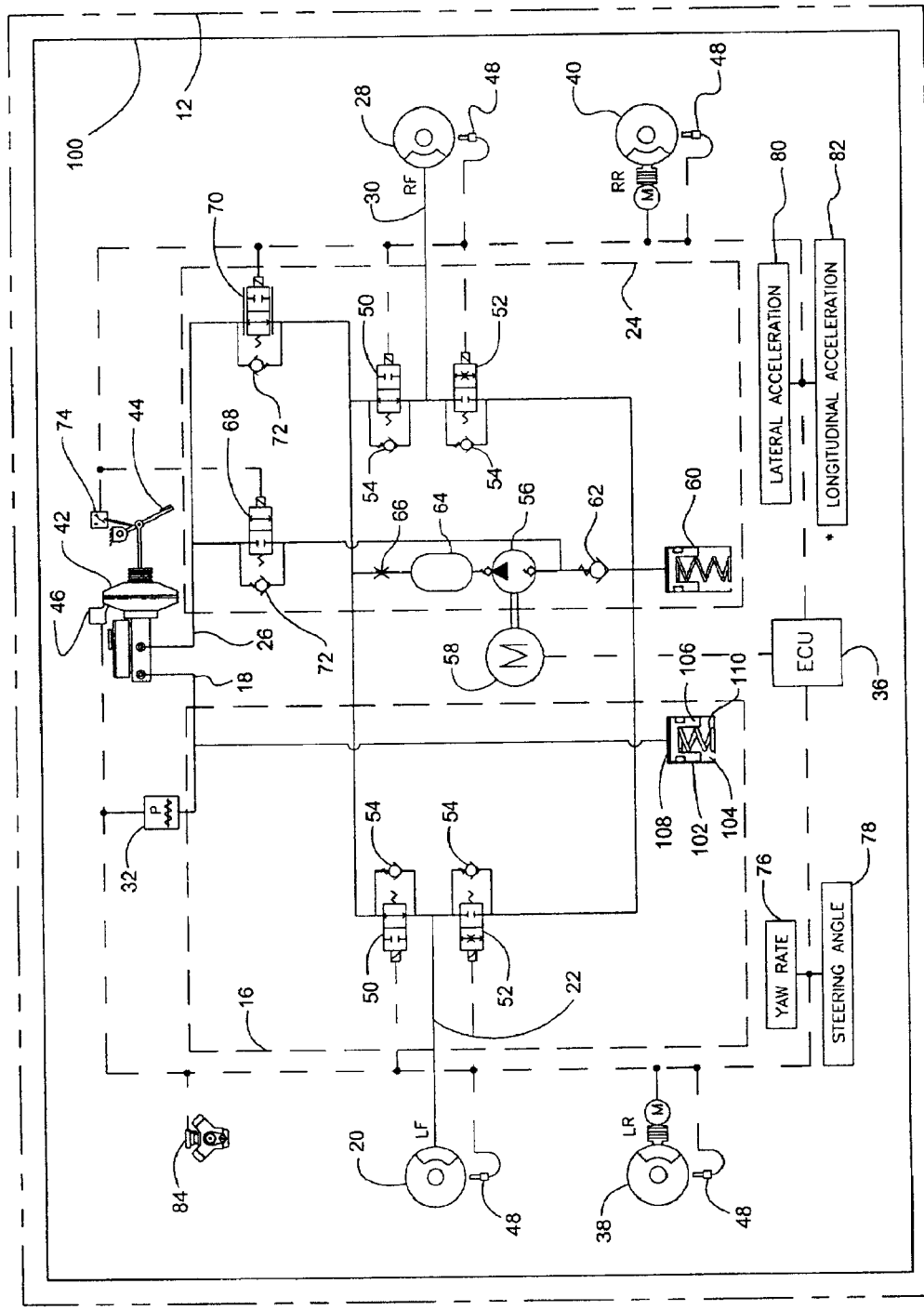
FIG. 2 is a schematic representation of a second embodiment of a brake apparatus according to our invention, providing a Front/Rear (F/R) split failsafe hybrid brake system, having ABS, TCS, and VDC, and a pedal feel emulator.

FIG. 2 shows a second embodiment of a brake apparatus 100 according to our invention, that we refer to as a "Front/Rear (F/R) failsafe hybrid brake system, for a vehicle 12. The F/R system 100 utilizes most of the same elements described above with regard to the F/F/R system 10, with the same reference numbers being used to designate like components. The F/R brake apparatus 100 differs from the F/F/R system 10 in two significant aspects, however. In the F/R system 100 of FIG. 2, both front hydraulic brake means 20, 28 are part of the second fluid circuit, and only a single pressure sensor 32, operatively connected for sensing hydraulic pressure in the first fluid circuit, is used for controlling the rear electrically actuated brake means 38, 40.

With the F/R hybrid system 100, a failure of the pressure sensor 32 results in the loss of braking capability from the rear electrically actuated brake means 38, 40, but both front hydraulic brake means 20, 28 remain fully operational. Conversely, a failure of the second fluid circuit will result in both front hydraulic brake means 20, 28 becoming inoperative, but the rear electrically actuated brake means 38, 40 will remain totally operational and controllable in the normal manner using the hydraulic pressure in the first hydraulic circuit, as sensed by the pressure sensor 32 and reported to the ECU 36. In either case, the braking means in two corners of the vehicle 12 remain fully operational after a single failure, thereby meeting regulatory and operational requirements for failsafe operation.

In an embodiment of the F/R hybrid brake apparatus 100 providing only basic braking operation, eliminating the second pressure sensor 34, required in the F/F/R apparatus 10 for acceptable failsafe operation, and virtually all of the fluid components in the first fluid circuit except the pressure sensor 32, provides significant advantages by reducing cost, weight, size, and complexity of the F/R hybrid brake apparatus 100. For an embodiment as depicted in FIG. 2, including full ABS, TCS, and VDC in addition to basic brake functionality the advantages are considerably greater.

All of the internal components of the first HCU 16 are eliminated. Specifically, the inlet accumulator 60, TCS check valve 62, damper chamber 64, damper orifice 66, prime valve 68, isolation valve 70, and the bypass check valves 72 associated with the prime and isolation valves 68, 70, are eliminated from the first HCU 16. Because the remaining hydraulic system is smaller after removal of these components, some of the remaining hydraulic components and the motor 58 can also potentially be downsized. The ability to eliminate or reduce the size of so many components while still providing failsafe operation, together with ABS, TCS and VDC is highly desirable in a vehicle brake system.

The F/R brake apparatus 100 also includes a pedal feel emulator 102, having a cylinder 104 in fluid communication with the hydraulic pressure in the first fluid circuit inside the first HCU 16. The pedal feel emulator 102 includes spring loaded piston means, in the form of a piston 106 slidably disposed within and sealed to the cylinder 104 to form a pressure cavity 108 within the cylinder 104 for receipt of hydraulic fluid from the master cylinder 14. A compression spring 110 generates a force on the piston resisting the entrance of fluid into the pressure cavity 108. The spring is judiciously sized such that the pedal feel experienced by a person depressing the brake pedal 44 is very similar to the pedal feel that would be experienced in a typical all hydraulic brake system.

Although the brake pedal feel emulator 102 appears similar in construction to the inlet accumulator 60, we contemplate that the spring 110 in the pedal feel emulator 102 would be much stiffer than the spring used in an inlet accumulator 60. We contemplate that the pedal feel emulator 102 would typically be operable over a pressure range of 0 to 500 PSI, as compared to an operating pressure range of 20 to 40 PSI for the inlet accumulator 60, with the actual operating range of the pedal feel emulator 102 being selected to provide a desired pedal feel for a given vehicle 12.

The F/R hybrid system 100 also includes a booster 42 for amplifying the hydraulic pressure in the first and second fluid circuits, and means in the form of vacuum booster sensor 46 and the ECU 36 for sensing failure of the booster 42, and compensating for the loss of amplification in the operation of the rear electrically actuated brake means 38, 40, after failure of the booster, in the same manner as described above in relation to the F/F/R brake apparatus 10.

In some forms of our invention, it may be desirable to utilize signals from the wheel speed sensors 48, and/or the pedal travel sensor 74, in addition to the hydraulic pressure as sensed by the pressure sensor (32 or 34) for controlling operation of the electrically actuated brake means 38, 40.

Those having skill in the art will recognize that, while we presently consider it preferable to have the components according to our invention arranged as described above, we contemplate many other arrangements within the scope of our invention. For example, the components of the first and second fluid circuits may be configured in either an F/F/R or F/R system according to our invention in many ways other than the first and second HCU 16, 24, depicted in the drawings. Our invention may also be practiced in many embodiments other than those depicted, providing only basic brake functions, and with other combinations of additional operating modes such as, but not limited to, ABS, TCS and VDC. The booster used in some forms of our invention may be of a type other than the vacuum driven booster described above.

As used herein, the term "electrically actuated brake means" is intended to include all forms of electro-mechanical, electro-hydraulic, electro-pneumatic, or other forms of electrically actuated brake devices. The pedal feel emulator 102 may be provided in many other embodiments, and configured as a stand-alone component, or incorporated into system elements other than in an HCU, such as the master cylinder 42. For pedal feel emulators using spring loaded piston means, many other devices, including bellows, diaphragms, or pressure bladders, etc., may be utilized. Our invention is also applicable to vehicles having more or less wheels than depicted in the exemplary embodiments, and to brake means of types other than the caliper brakes illustrated in FIGS. 1 and 2.

In summary therefore, while the embodiments of our invention disclosed herein are presently considered to be preferred, various changes and modifications can be made without departing from the spirit and scope of the invention. The scope of the invention is indicated in the appended claims, and all changes or modifications within the meaning and range of equivalents are intended to be embraced therein.

We claim:

1. A brake apparatus for a vehicle having a plurality of wheels, the brake apparatus comprising:
    a first front hydraulic brake;
    a second front hydraulic brake;
    a first hydraulic control unit in fluid communication with the first front hydraulic brake and the second front hydraulic brake to control an operation of the first front hydraulic brake and the second front hydraulic brake based on a first hydraulic pressure in the first hydraulic control unit;
    a second hydraulic control unit;
    a pressure sensor operatively connected to the second hydraulic control unit to sense a second hydraulic pressure in the second hydraulic control unit;
    at least one rear electrically actuated brake; and
    an electronic control unit in electrical communication with the pressure sensor and the at least one rear electrically actuated brake to control an operation of the at least one rear electrically actuated brake based on the second hydraulic pressure in the second hydraulic control unit.

2. The brake apparatus of claim 1,
    wherein the electronic control unit is in electrical communication with the first hydraulic control unit to control an anti-lock braking of the vehicle.

3. The brake apparatus of claim 1,
    wherein the electronic control unit is in electrical communication with the first hydraulic control unit to control a traction control of the vehicle.

4. The brake apparatus of claim 1,
    wherein the electronic control unit is in electrical communication with the first hydraulic control unit to control a vehicle dynamics control of the vehicle.

5. The brake apparatus of claim 1, further comprising:
    a master cylinder in fluid communication with the first hydraulic control unit and the second hydraulic control unit.

6. The brake apparatus of claim 5, further comprising:
    a vacuum booster in electric communication with the master cylinder to amplify the first hydraulic pressure in the first hydraulic control unit and the second hydraulic pressure in the second hydraulic control unit.

7. The brake apparatus of claim 1,
wherein the second hydraulic control unit includes a pedal feel emulator.

8. A brake apparatus for a vehicle having a plurality of wheels, each wheel being adjacent a distinctive corner of the vehicle, the brake apparatus comprising:
a first hydraulic brake adjacent a first corner of the vehicle;
a second hydraulic brake adjacent a second corner of the vehicle;
a first hydraulic control unit in fluid communication with the first hydraulic brake and the second hydraulic brake to control an operation of the first hydraulic brake and the second hydraulic brake based on a first hydraulic pressure in the first hydraulic control unit;
a second hydraulic control unit;
a pressure sensor operatively connected to the second hydraulic control unit to sense a hydraulic pressure in the second hydraulic control unit;
a first electrically actuated brake adjacent a third corner of the vehicle; and
an electronic control unit an electrical communication with the pressure sensor and the first electrically actuated brake to control an operation of the first electrically actuated brake based on the second hydraulic pressure in the second hydraulic control unit.

9. The brake apparatus of claim 8,
wherein the electronic control unit is in electrical communication with the first hydraulic control unit to control an anti-lock braking of the vehicle.

10. The brake apparatus of claim 8,
wherein the electronic control unit is in electrical communication with the first hydraulic control unit to control a traction control of the vehicle.

11. The brake apparatus of claim 8,
wherein the electronic control unit is in electrical communication with the first hydraulic control unit to control a vehicle dynamics control of the vehicle.

12. The brake apparatus of claim 8, further comprising:
a master cylinder in fluid communication with the first hydraulic control unit and the second hydraulic control unit.

13. The brake apparatus of claim 12, further comprising:
a vacuum booster in electric communication with the master cylinder to amplify the first hydraulic pressure in the first hydraulic control unit and the second hydraulic pressure in the second hydraulic control unit.

14. The brake apparatus of claim 8,
wherein the second hydraulic control unit includes a pedal feel emulator.

15. The brake apparatus of claim 8, further comprising:
a second electrically actuated brake adjacent a fourth corner of the vehicle; and
wherein the electronic control unit is in electrical communication with the pressure sensor, the first electrically actuated brake and the second electrically actuated brake to control an operation of the first electrically actuated brake and the second electrically actuated brake based on the second hydraulic pressure in the second hydraulic control unit.

16. A brake apparatus for a vehicle having a plurality of wheels, the brake apparatus comprising:
a master cylinder;
a first front hydraulic brake,
a second front hydraulic brake;
means for controlling an operation of the first front hydraulic brake and the second front hydraulic brake based on a first hydraulic pressure of a flow of a first hydraulic fluid from the master cylinder to the first front hydraulic brake and the second front hydraulic brake;
at least one rear electrically actuated brake;
a pedal feel emulator; and
means for controlling an operation of the at least one rear electrically actuated brake based on a second hydraulic pressure of a flow of a second hydraulic fluid from the master cylinder to the pedal feel emulator.

17. A brake apparatus for a vehicle having a plurality of wheels, each wheel being adjacent a distinctive corner of the vehicle, the brake apparatus comprising:
a first hydraulic brake adjacent a first corner of the vehicle;
a second hydraulic brake adjacent a second corner of the vehicle;
means for controlling an operation of the first front hydraulic brake and the second front hydraulic brake based on a first hydraulic pressure of a flow of a first hydraulic fluid from the master cylinder to the first front hydraulic brake and the second front hydraulic brake;
a first electrically actuated brake adjacent a third corner of the vehicle;
a pedal feel emulator; and
means for controlling an operation of the first electrically actuated brake based on a second hydraulic pressure of a flow of a second hydraulic fluid from the master cylinder to the pedal feel emulator.

18. The brake apparatus of claim 17, further comprising:
a second electrically actuated brake adjacent a fourth corner of the vehicle; and
means for controlling an operation of the second electrically actuated brake based on a second hydraulic pressure of a flow of a second hydraulic fluid from the master cylinder to the pedal feel emulator.

* * * * *